United States Patent
Kim et al.

(10) Patent No.: US 7,650,148 B2
(45) Date of Patent: Jan. 19, 2010

(54) METHOD OF PROCESSING CALL TO UNREGISTERED USER IN WLAN-GPRS NETWORK USING SIP

(75) Inventors: Soon Choul Kim, Daejeon (KR); Hyun Woo Lee, Daejeon (KR); Won Ryu, Deajeon (KR); Dong Won Kim, Daejeon (KR)

(73) Assignees: Electronics and Telecommunications Research Institute, Daejeon (KR); KT Corporation, Kyoungki-Do (KR)

( * ) Notice: Subject to any disclaimer, the term of this patent is extended or adjusted under 35 U.S.C. 154(b) by 969 days.

(21) Appl. No.: 11/195,993

(22) Filed: Aug. 2, 2005

(65) Prior Publication Data
US 2006/0140149 A1    Jun. 29, 2006

(30) Foreign Application Priority Data
Dec. 27, 2004    (KR) ...................... 10-2004-0112647

(51) Int. Cl.
*H04W 4/00* (2009.01)
(52) U.S. Cl. ................. 455/435.1; 455/432.1; 455/433; 455/435.2; 455/436; 455/440; 455/445; 370/328; 370/338
(58) Field of Classification Search ......... 455/410–411, 455/435.1–3, 436–449, 432.1, 432.3, 433; 370/328–338
See application file for complete search history.

(56) References Cited

U.S. PATENT DOCUMENTS 6,766,168 B1 *  7/2004  Lim ........................ 455/435.1
6,862,446 B2 *  3/2005  O'Neill et al. ........... 455/422.1
7,411,927 B1 *  8/2008  Bhalla et al. ................ 370/331
2005/0117556 A1 *  6/2005  Lee et al. .................... 370/338

FOREIGN PATENT DOCUMENTS

| KR | 1020030083428 | 10/2003 |
|---|---|---|
| KR | 1020040070929 | 8/2004 |
| WO | WO 03/092190 | * 11/2003 |

OTHER PUBLICATIONS

"WLAN-GPRS Integration for Next-Generation Mobile Data Networks", A. Salkintzis, et al., IEEE Wireless Communications, Oct. 2002, pp. 112-124.

* cited by examiner

*Primary Examiner*—Tuan A Tran
(74) *Attorney, Agent, or Firm*—Blakely, Sokoloff, Taylor & Zafman LLP (57) ABSTRACT

A method of processing a call to an unregistered user in a Wireless Local Area Network (WLAN)-General Packet Radio Service (GPRS) using a Session Initiation Protocol (SIP) is provided. The method of connecting a call to a mobile node present in a GPRS area includes registering location information of the mobile node to be invited in a Home Subscriber Server (HSS); when the mobile node uses a Mobile Internet Protocol (MIP), allocating an Internet Protocol (IP) address to the mobile node and authenticating the mobile node through MIP registration and setting a SIP session; and when the mobile node uses a simple IP, allocating an IP address to the mobile node and authenticating the mobile node through a Dynamic Host Configuration Protocol (DHCP) procedure and setting a SIP session.

17 Claims, 12 Drawing Sheets

METHOD OF PROCESSING CALL TO UNREGISTERED USER IN WLAN-GPRS NETWORK USING SIP

CROSS-REFERENCE TO RELATED PATENT APPLICATIONS

This application claims the benefit of Korean Patent Application No. 10-2004-0112647, filed on Dec. 27, 2004, in the Korean Intellectual Property Office, the disclosure of which is incorporated herein in its entirety by reference.

BACKGROUND OF THE INVENTION

1. Field of the Invention

The present invention relates to a method of processing a call to an unregistered user in a 3rd Generation-General Packet Radio Service (3G-GPRS) based Wireless Local Area Network (WLAN) for Voice over Internet Protocol (VoIP) based on a Session Initiation Protocol (SIP).

2. Description of the Related Art

In order to take an SIP based VoIP service in a conventional WLAN environment, a mobile node (MN) must always be connected to an IP and complete SIP registration to connect a call from another MN. In this situation, due to nonexistence of location based service in the WLAN environment, it is difficult to detect the location of a MN. In addition, every MN occupies resources for IP connection to make SIP registration in a network.

SUMMARY OF THE INVENTION

The present invention provides a method of processing a Voice over Internet Protocol (VoIP) call to an unregistered user, i.e., an unregistered mobile node (MN) in a 3rd Generation-General Packet Radio Service (3G-GPRS) based Wireless Local Area Network (WLAN), by which a Home Subscriber Server (HSS) registers the location of the unregistered MN, which uses a dual mode or is exclusively used for the WLAN, using a Media Access Control (MAC) address of the unregistered MN without inefficiently occupying network resources, so that a VoIP call to the unregistered user can be normally processed when the MN is handed off to a GPRS or WLAN environment.

According to an aspect of the present invention, there is provided a method of registering and handing off a mobile node, including collecting a MAC address of a user of the mobile node and transmitting the MAC address from an access point (AP) to an Access Point Manager (APM) when association occurs between the AP and the mobile node; determining one among initial registration of the mobile node and moving of the mobile node based on the MAC address in the APM; sending a MAC request message to a HSS if the initial registration of the mobile node is determined; and updating a database with the MAC address of the mobile node and transmitting registration information to the AP, if the initial registration is determined by the HSS receiving the MAC request message.

According to another aspect of the present invention, there is provided a method of connecting a call to a mobile node present in a GPRS area using a Session Initiation Protocol (SIP), the method including registering location information of the mobile node to be invited in a HSS; when the mobile node uses a Mobile Internet Protocol (MIP), allocating an Internet Protocol (IP) address to the mobile node and authenticating the mobile node through MIP registration and setting a SIP session; and when the mobile node uses a simple IP, allocating an IP address to the mobile node and authenticating the mobile node through a Dynamic Host Configuration Protocol (DHCP) procedure and setting a SIP session.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
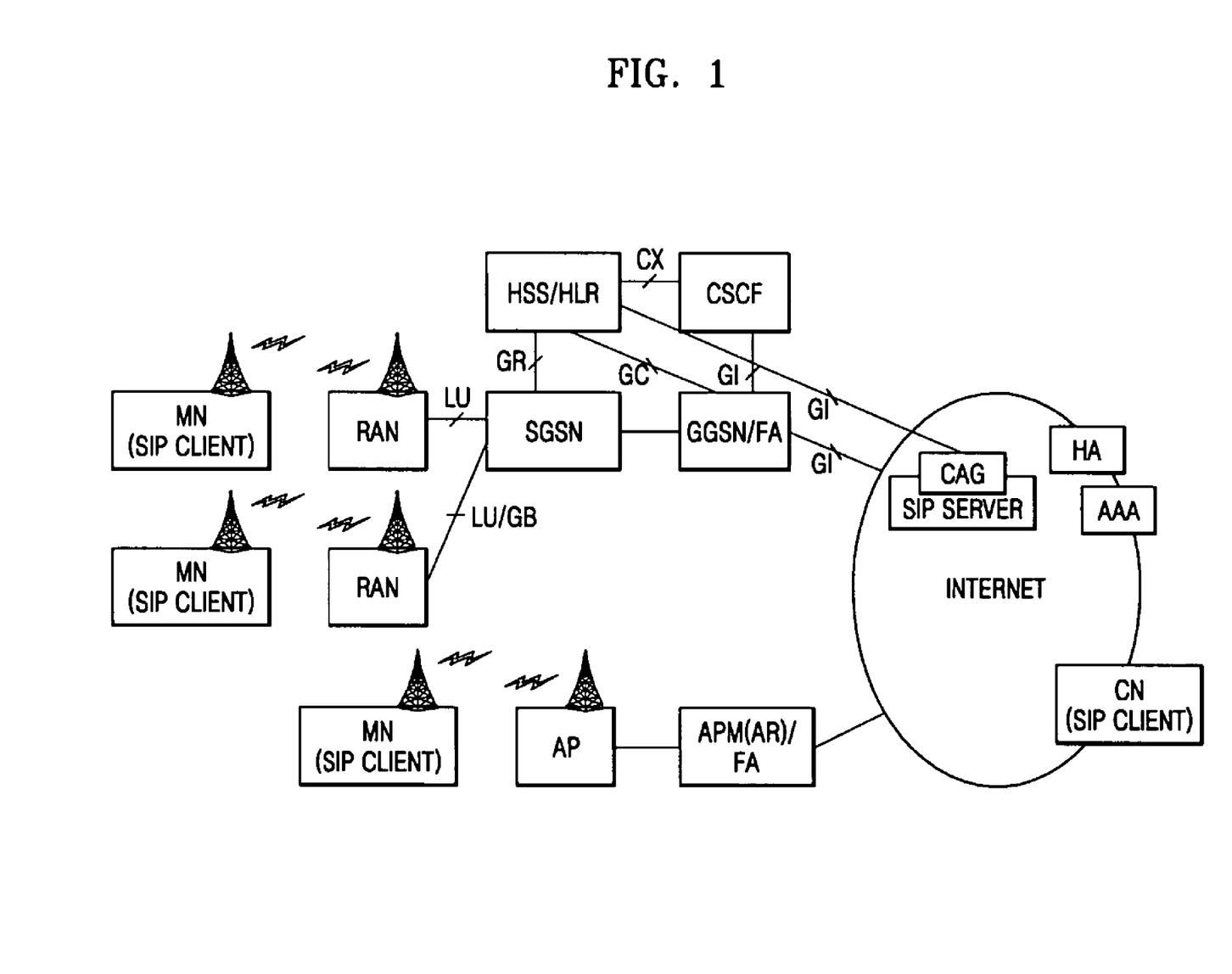
FIG. 1 illustrates the structure of a network for a conventional 3rd Generation-General Packet Radio Service (3G-GPRS) based Wireless Local Area Network (WLAN)

FIG. 1 illustrates the structure of a network for a conventional 3rd Generation-General Packet Radio Service (3G-GPRS) based Wireless Local Area Network (WLAN). In this structure, an Internet Protocol (IP) Multimedia Subsystem (IMS)-stage2 environment is assumed, and a service is made possible in a tightly coupled structure and a loosely coupled structure. In the tightly coupled structure, a WLAN is interfaced (LU or GB) as a Radio Access Network (RAN), and therefore, it is defined that the WLAN complies with processes such as location registration and hand off performed in the RAN. In the loosely coupled structure, a Cable Access Gateway (CAG) including a Session Initiation Protocol (SIP) server function is defined and a service providing procedure is suggested.

A Home Subscriber Server (HSS)/Home Location Register (HLR) includes GPRS subscription data and routing information. A HLR can be accessed by a Serving GPRS Service Node (SGSN) through a GR interface and can interface with a Gateway GPRS Service Node (GGSN) through a GC interface. A HSS system is a sub-system that processes mobile node (MN) information and subscriber information in real time and is also a master database (DB) managing a subscriber service profile including a subscriber number, address information, security information, authentication information, authority verification information, and location information.

To use GPRS, a MN initially must notify a network of its existence, which is achieved using a GPRS attach procedure. Thereafter, the MN can use a short message service (SMS) through the GPRS, can be paged by the SGSN, and can perform notification of incoming packet data. A mobile station (MS) must activate a Packet Data Protocol (PDP) context to transmit and receive packet data using the GPRS. Through this activation, the MS is notified to the GGSN and can be linked to a data network.

Figure 2:
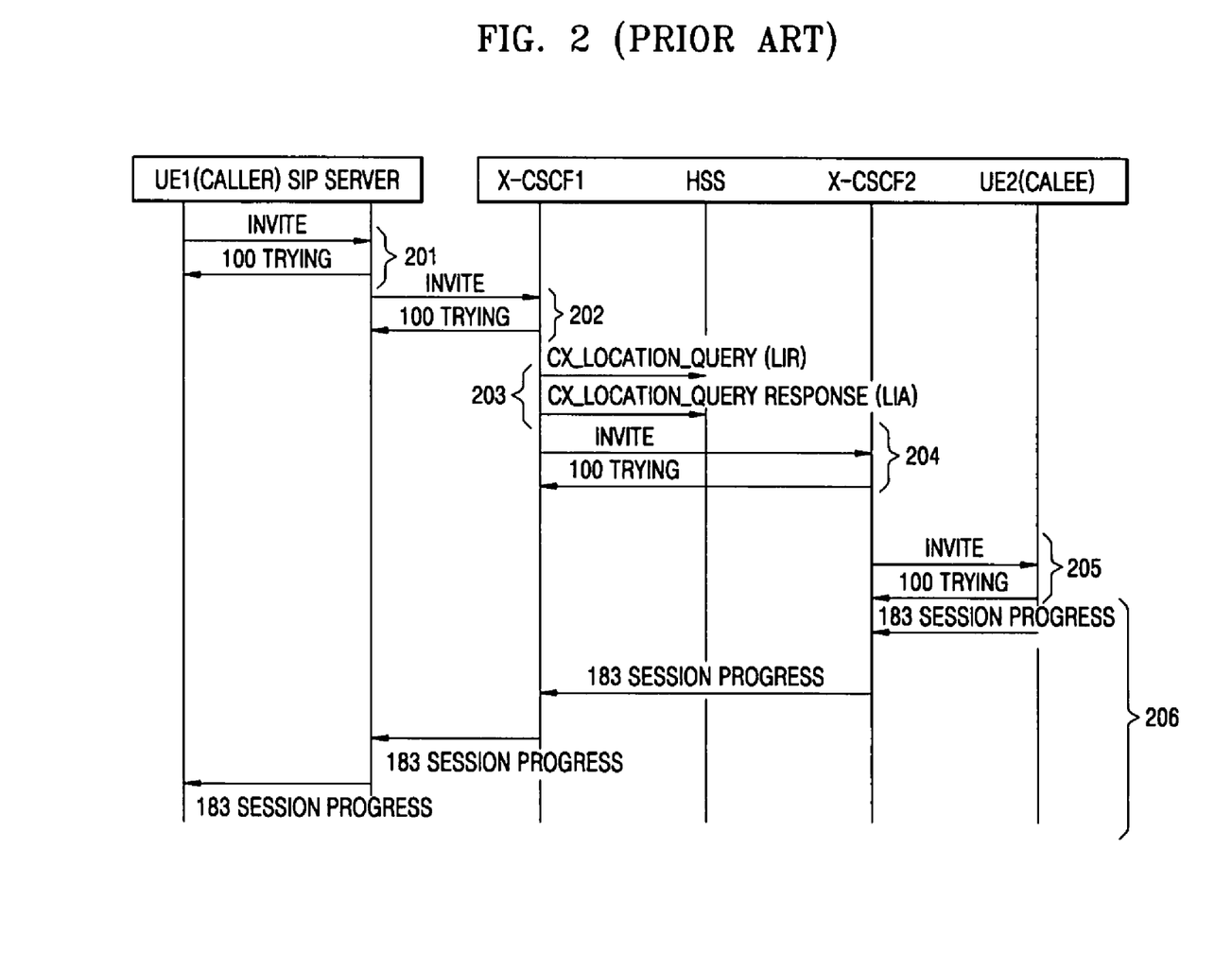
FIG. 2 is a flowchart of a conventional session setup procedure for a Session Initiation Protocol (SIP) mobile node (MN)

FIG. 2 is a flowchart of a conventional session setup procedure for a registered SIP MN. To use a Voice over Internet Protocol (VoIP) service through a SIP in the conventional GPRS environment, a SIP client must be registered in a Call Session Control Function (CSCF) or a SIP server. Here, a service session is set through a procedure shown in FIG. 2.

It is assumed that a user equipment (UE)1 and a UE2 have been registered in different home networks, respectively. Registration of the UE1 and the UE2 is performed according to a standard procedure. Hereinafter, a proxy CSCF (P-CSCF), a serving CSCF (S-CSCF), and an interrogating CSCF (I-CSCF) are represented with an "X-CSCF". The details of a procedure between CSCFs comply with an existing standard, and thus a detailed description thereof is omitted. When the UE1 on the Internet sends "INVITE" to the SIP server, the SIP server sends "100 Trying" to the UE1 in response to the INVITE (Operation 201) and redirects the INVITE to an X-CSCF1 of a 3G network (Operation 202). The X-CSCF1 detects the registered location of the UE2 through a query to a HSS (Operation 203) and redirects the INVITE to an X-CSCF2 (Operation 204). Here, the X-CSCF1 and the X-CSCF2 may be the same. The X-CSCF2 sends the INVITE to the UE2 (Operation 205). Then, the UE2 responds with 183 Session Progress (Operation 206). As a result, session setup is normally accomplished. More detailed descriptions are found in an Internet Engineering Task Force (IETF) Request For Comments (RFC) 2543 SIP protocol and a 3rd Generation Partnership Project (3GPP) Technical Specification (TS) 23.228 IMS-stage 2 and are thus omitted here.

Figure 3:
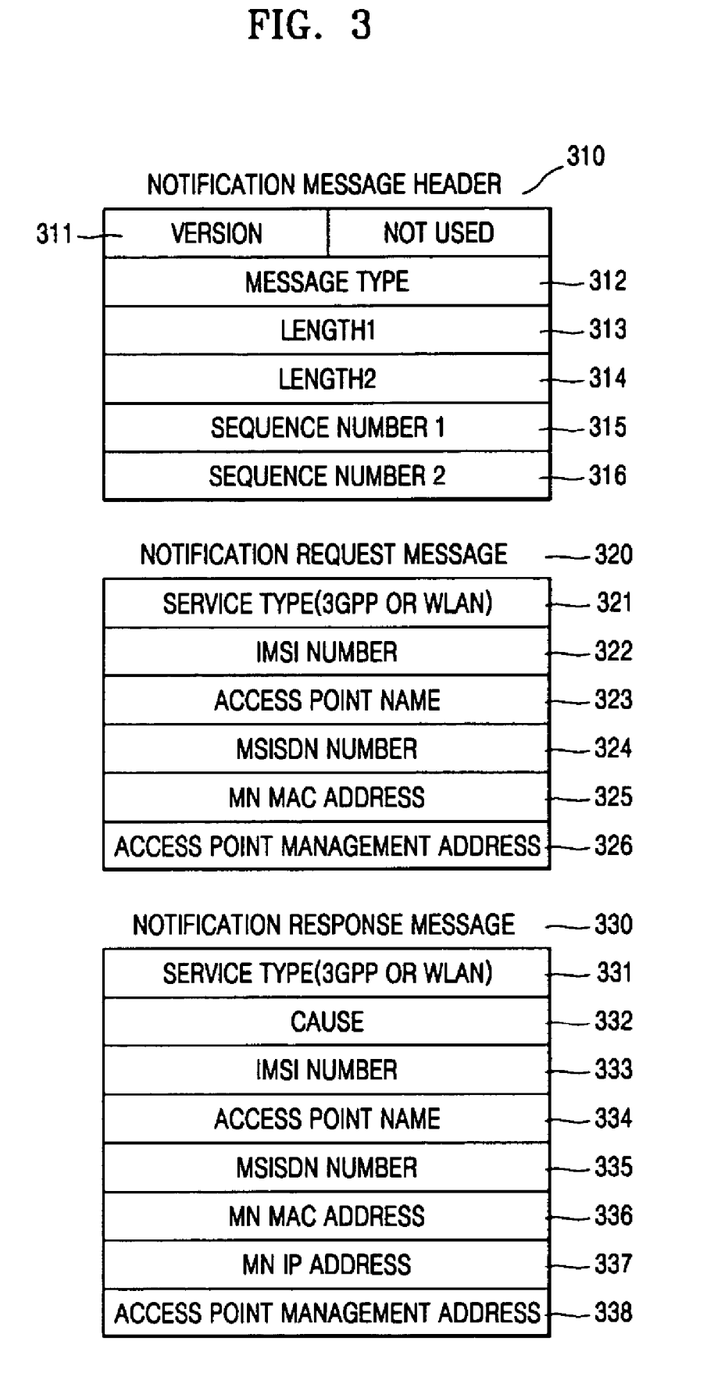
FIG. 3 illustrates the format of a Notification message according to an embodiment of the present invention.

FIG. 3 illustrates the format of a Notification message for a push service and network request PDP context activation according to an embodiment of the present invention. In a 3GPP network, when using a procedure for supplying information from a network to a UE as in a push service and activating the UE as in PDP context, a UE that has not been registered and has not been allocated an IP resource can be activated so that SIP based VoIP session setup for the UE is accomplished (Refer to a Network Request PDP Context Activation procedure in the TS23.060 GPRS Service Description stage2 and to TS23.875 Support of Push Service).

A Notification message header 310 includes a version field 311, a type field 312 indicating a type of message, fields 313 and 314 indicating a length of a message, and fields 315 and 316 indicating a sequence of the message. A Notification Request message 320 includes a service type field 321 used to distinguish a 3GPP network from a WLAN, an International Mobile Station Identity (IMSI) number field 322, an access point (AP) name field 323, a Mobile Station Integrated Services Digital Network (MSISDN) number field 324, a MN Media Access Control (MAC) address field 325, and an access point manager (APM) address field 326. A Notification Response message 330 includes a service type field 331 used to distinguish a 3GPP network from a WLAN, a cause field 332 indicating an error code value of the response message, an IMSI number field 333, an AP name field 334, a MSISDN number field 325, a MN MAC address field 336, a MN IP address field 337, and an APM address field 338.

A Notification Request message and a Notification Response message which are used in the network request PDP context activation procedure are modified into the message formats shown in FIG. 3 to contain a MAC address and an AP address.

Figure 4:
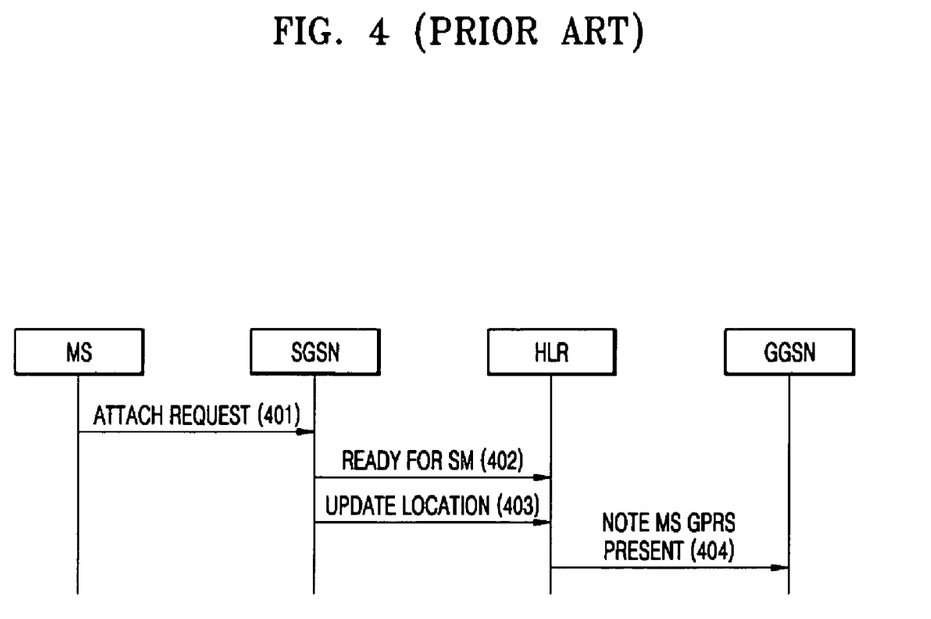
FIG. 4 is a flowchart of a conventional mobile user activity procedure.

FIG. 4 is a flowchart of a procedure for location registration and update when Attach/Detach or hand off is performed between a MN and a GPRS through a wireless access network in the conventional GPRS environment. A SGSN is notified by a MS that the MS is reachable. For example, the SGSN receives an Attach Request message from the MS in operation 401. When the SGSN has mobility management (MM) context for the MS and a Mobile Station Not Reachable for GPRS (MNRG) flag set for the MS, the SGSN sends a "Ready for SM (containing an IMSI number and MS Reachable)" to a HLR and clears the MNRG flag in operation 402.

However, when the SGSN does not have the MM context, the SGSN sends an Update Location message (see the subclause "GPRS Attach Function") to the HLR in operation 403. In response to the Ready for SM message or the Update Location message, the HLR sends a Note MS GPRS Present message (containing an IMSI number and a SGSN address) to all GGSNs in a subscriber's list.

When a SGSN number has been changed since GPRS detach or when initial attach is performed, the Update Location message is transmitted through the following operations:

a) The SGSN sends Update Location (including the SGSN number, the SGSN address, and the IMSI number) to the HLR; and b) The HLR sends Cancel Location (including the IMSI number and a cancellation type) to an old SGSN.

Figure 5:
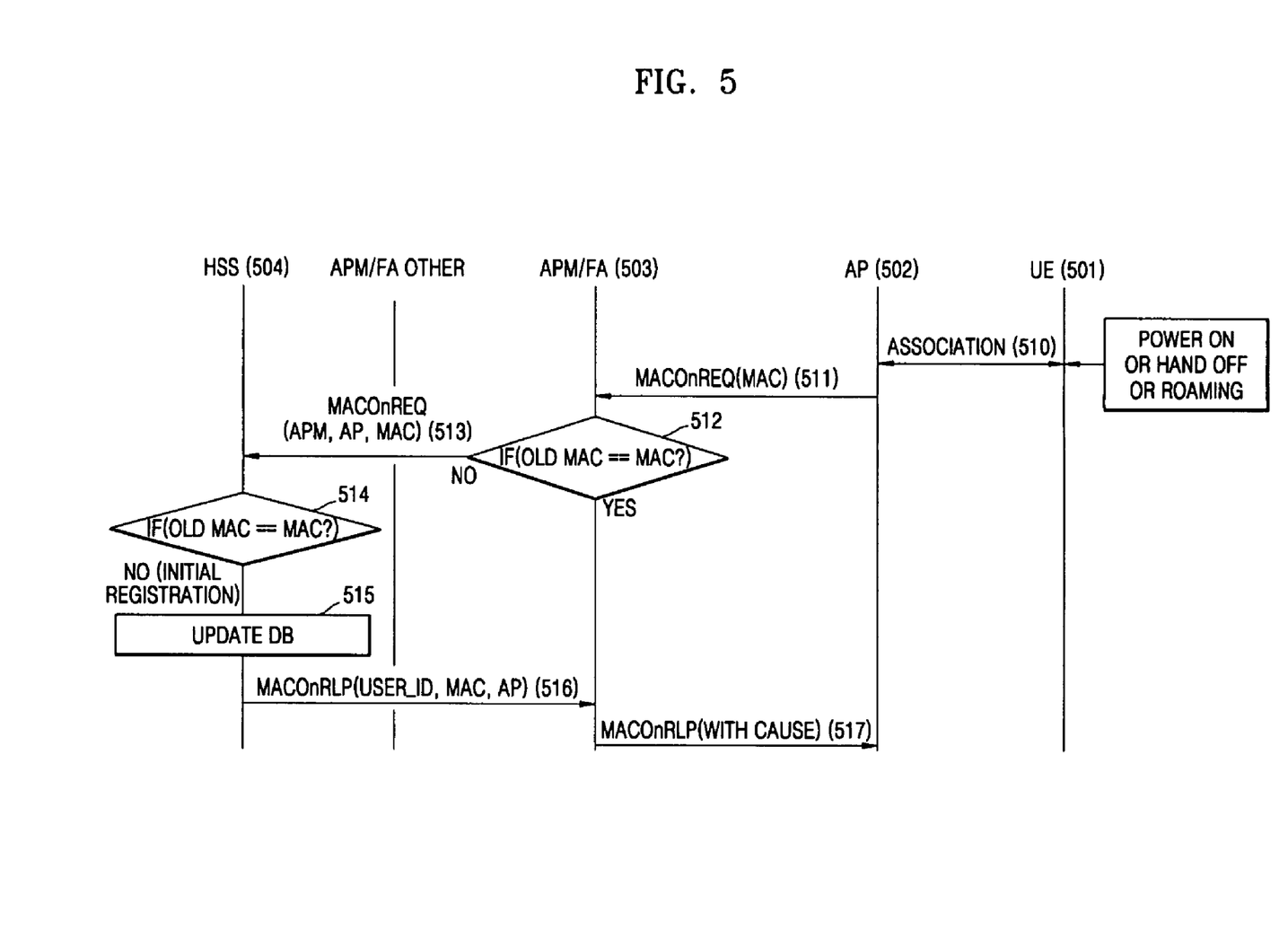
FIG. 5 is a flowchart of an initial registration procedure in a WLAN area, according to an embodiment of the present invention.
Figure 6:
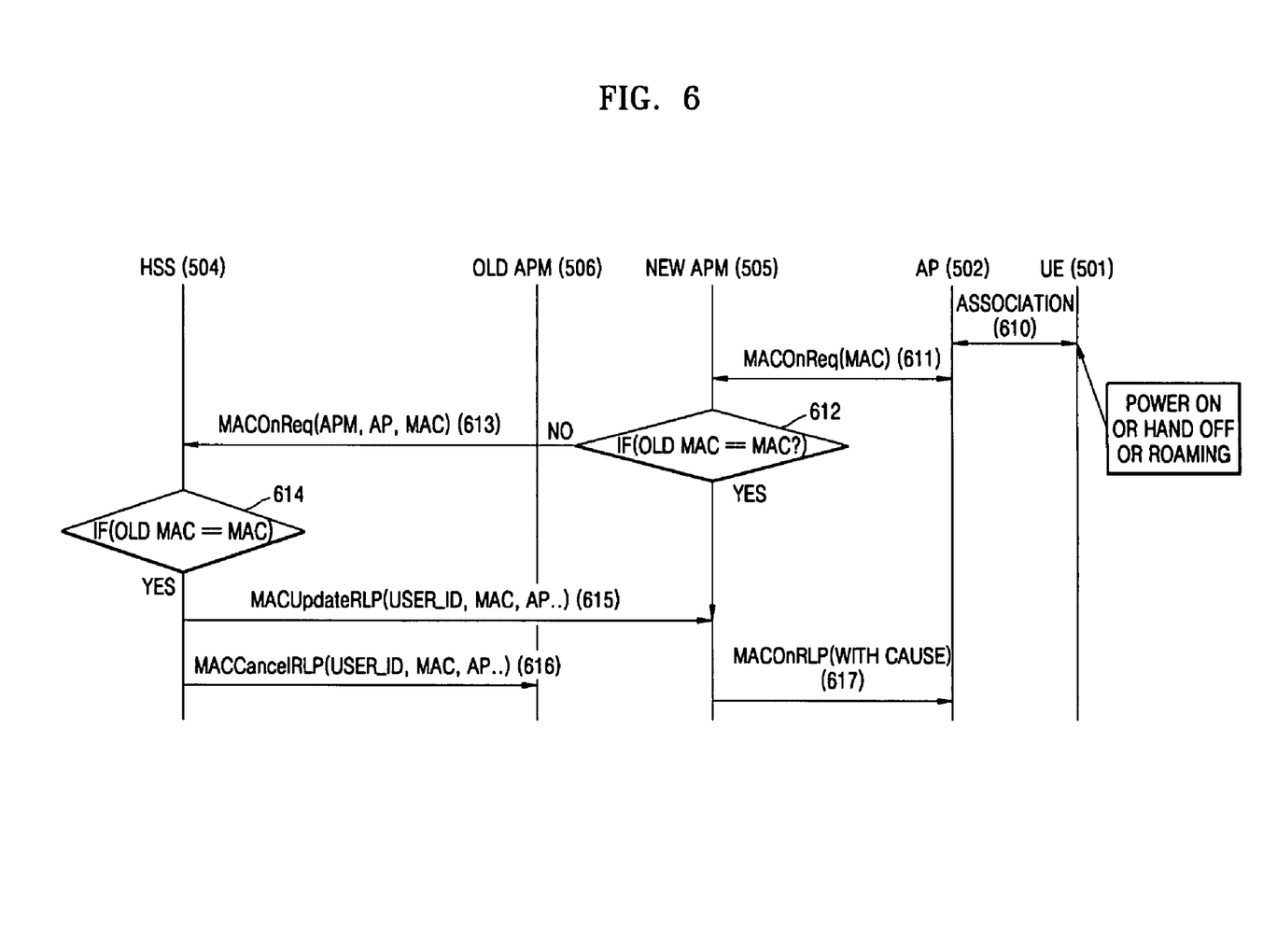
FIG. 6 is a flowchart of a processing procedure when hand off occurs in a WLAN area, according to an embodiment of the present invention.

FIG. 5 is a flowchart of an initial registration procedure in a WLAN area, according to an embodiment of the present invention. FIG. 6 is a flowchart of a processing procedure when hand off occurs in the WLAN area, according to an embodiment of the present invention.

Referring to FIG. 5, when association is performed between an AP 502 and a MN (hereinafter, the MN is assumed to indicate a UE in the drawings) 501 in the WLAN area due to power ON or hand off in operation 510, the AP 502 collects a subscriber's MAC address and sends it to an APM/foreign agent (FA) 503 in operation 511.

The APM/FA 503 searches an APM DB to determine whether the MN 501 having the MAC address operates for initial registration or moves due to hand off or roaming in operation 512. When the MAC address is not present in the APM DB, the APM/FA 503 queries a HSS 504 via a CAG using a MACOnReq message in operation 513.

When initial registration is determined based on the MAC address in operation 514, the HSS 504 updates its DB in operation 515 and transmits a MACOnRLP message to the APM/FA 503 in operation 516. The APM/FA 503 sends the MACCOnRLP message to the AP 502 in operation 517.

Referring to FIG. 6, when association is performed between the AP 502 and the MN 501 in the WLAN area due to hand off or roaming in operation 610, the AP 502 collects a subscriber's MAC address and transmits it to a new APM 505 that the MN 501 newly accesses in operation 611.

The new APM 505 searches an APM DB to determine whether the MN 501 having the MAC address operates for initial registration or moves due to hand off or roaming in operation 612. When the MAC address is not present in the APM DB, the new APM 505 queries the HSS 504 via a CAG using a MACOnReq message in operation 613.

When initial registration is determined based on the MAC address in operation 614, the HSS 504 transmits a MACUpdateRLP message to the new APM 505 to instruct the new APM 505 to update the APM DB in operation 615 and sends a MACCancelRLP message to an old APM 506 to instruct the old APM 506 to cancel the MAC address in operation 616. The new APM 505 sends a MACOnRLP to the AP 502 in operation 617. In case of vertical hand off from a GPRS area, a Cancel Location message (including an IMSI name and a cancellation type) is sent to an old SGSN that the MN 501 accessed previously.

Figure 7:
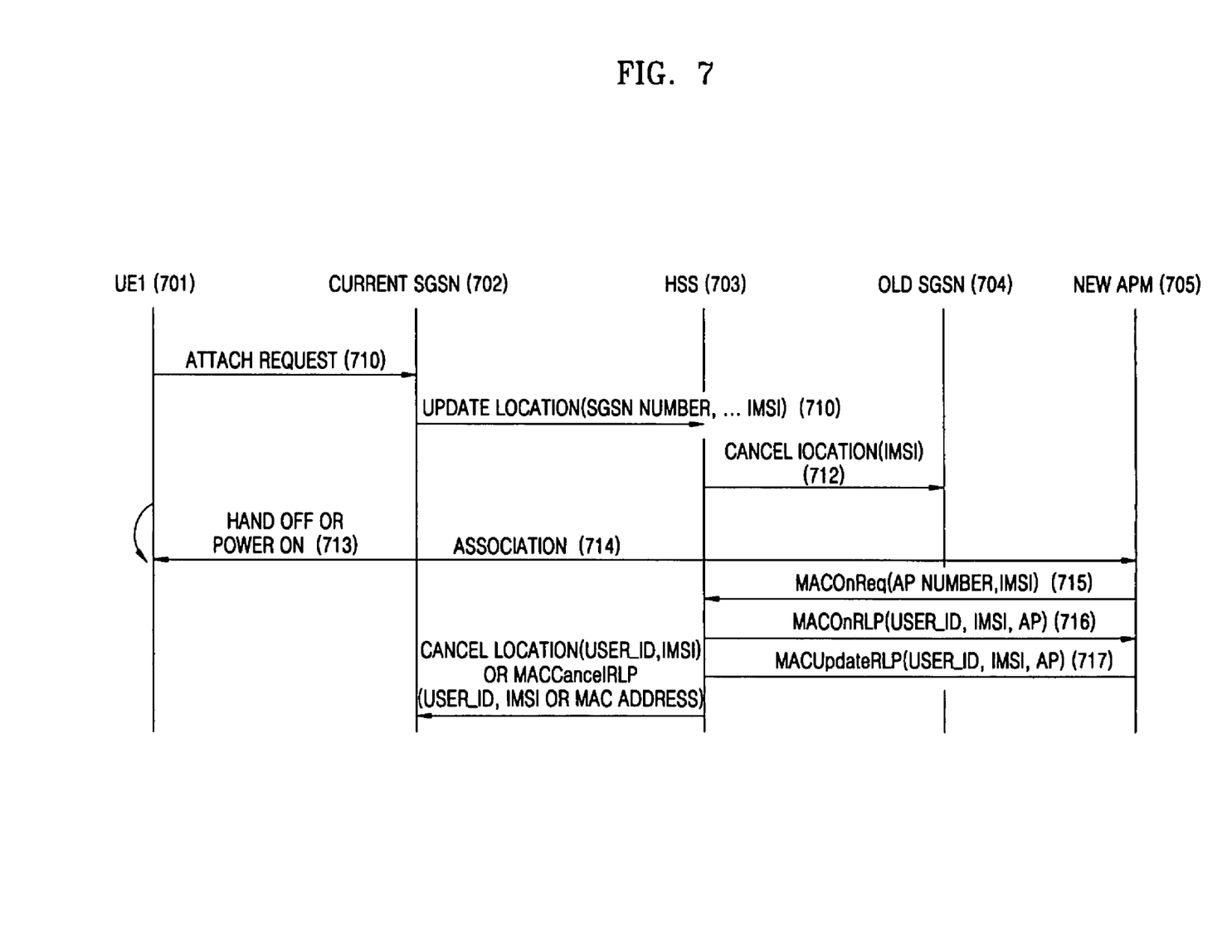
FIG. 7 is a flowchart of a location registration procedure performed when a dual-mode MN is handed off from a GPRS area to a WLAN area, according to an embodiment of the present invention.

FIG. 7 is a flowchart of a location registration procedure performed for a dual-mode MN when vertical hand off from a GPRS area to a WLAN area is performed, according to an embodiment of the present invention.

When a UE1 701 is activated on a wireless network under a mobile network environment (i.e., a GPRS area), the UE1 701 sends an Attach request to a current SGSN 702 to which the UE1 701 belongs in operation 710. Then, the current SGSN 702 instructs a HSS 703 to update location information of the UE1 701 in operation 710. The HSS 703 requests an old SGSN 704, i.e., an existing location register node, to cancel the location information of the UE1 701, using its DB, in operation 712. When the UE1 701 enters a WLAN area in operation 713, association is accomplished between the UE1 701 and a new APM 705, to which the UE1 701 belongs, in operation 714. Thereafter, the new APM 705 and the HSS 703 perform a procedure for registering the location information of the UE1 701 in operations 715, 716, and 717. Here, the HSS 703 requests the current SGSN 702, i.e., an existing location register node, to cancel the location information of the UE1 701, using its DB, thereby notifying that the UE1 701 is moved.

Figure 8:
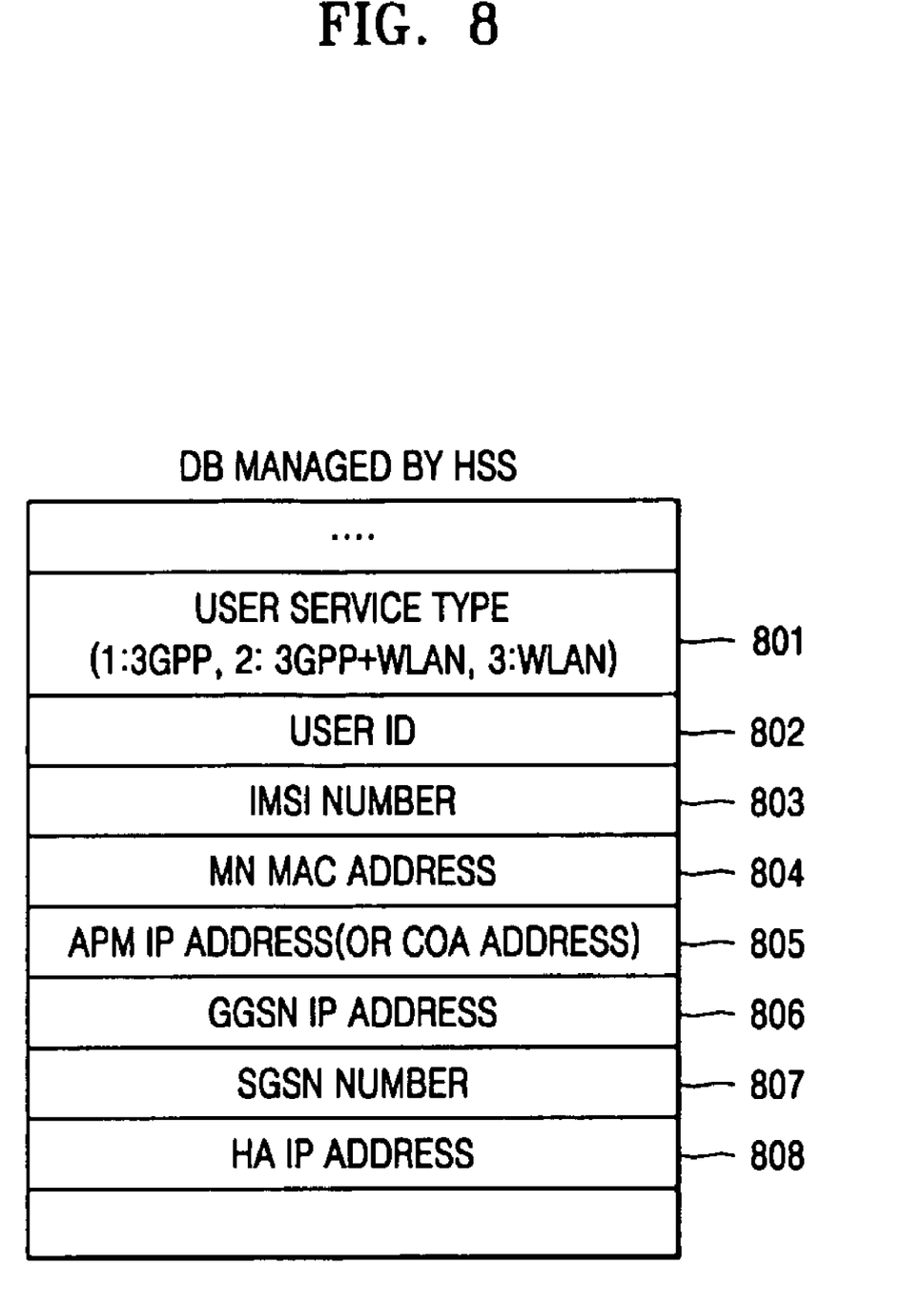
FIG. 8 illustrates the structure of a subscriber database (DB) of a Home Service Server (HSS) and an Access Point Manager (APM) according to an embodiment of the present invention.

FIG. 8 illustrates the structure of a subscriber DB of a HSS and an APM, which is related with location registration, according to an embodiment of the present invention. The HSS must have a DB related with registration of a user's location for a mobile network service, i.e., a GPRS, and a WLAN service. The DB managed by the HSS includes a user service type field 801 for identifying a type of service used by the user (e.g., 3GPP, 3GPP+WLAN, or WLAN), a user identifier (ID) field 802 used to access the service, an IMSI number field 803 indicating the user's MN number, a MN MAC address field 804, a field 805 indicating an IP address of an APM to which the MN belongs, a field 806 indicating an IP address of a GGSN to which the MN belongs, a SGSN number field 807, and a home agent (HA) IP address field 808 for a mobile IP service.

Figure 9A:
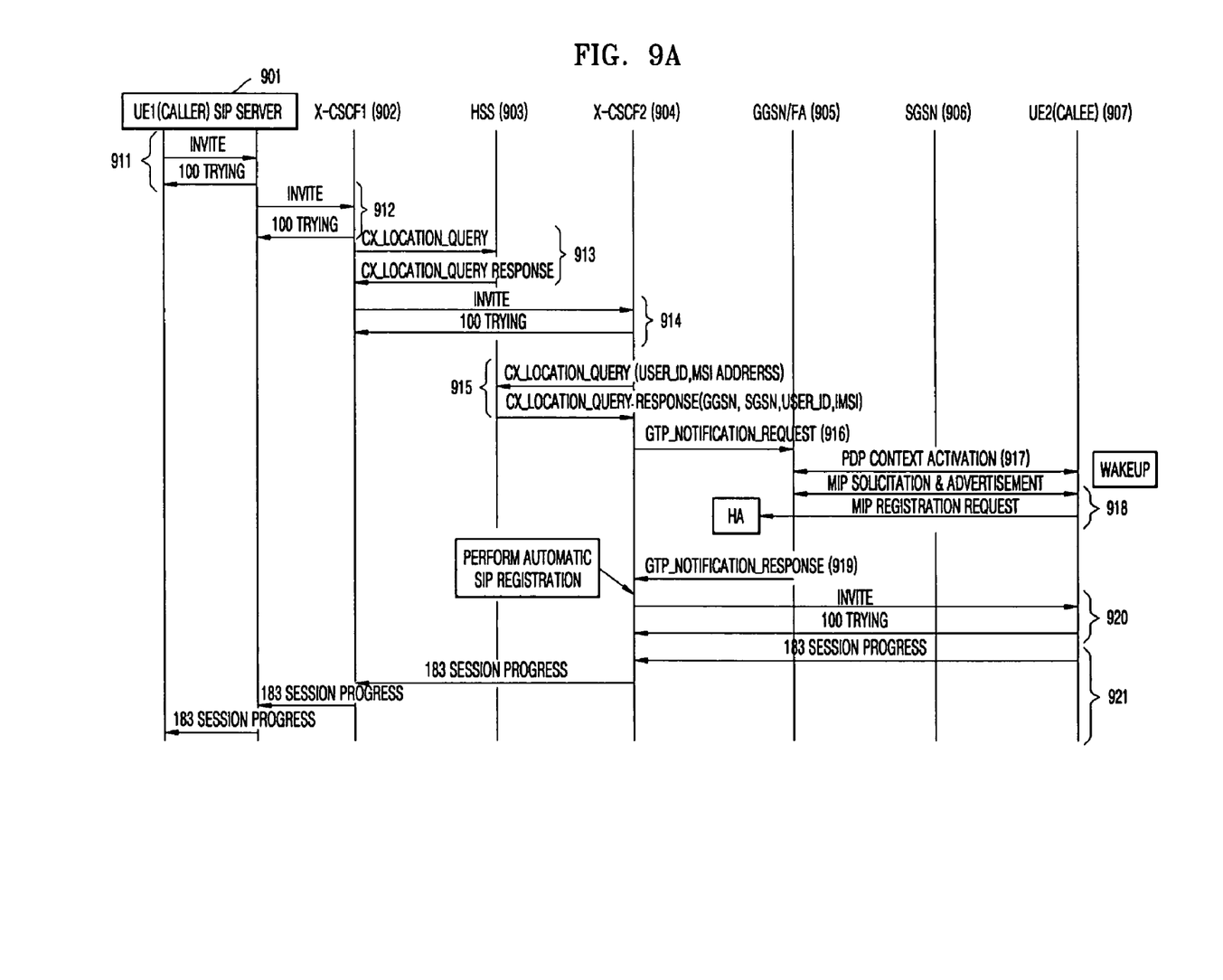
FIG. 9A is a flowchart of SIP INVITE performed when an unregistered MN uses a Mobile Internet Protocol (MIP) in a GPRS area, according to an embodiment of the present invention.
Figure 9B:
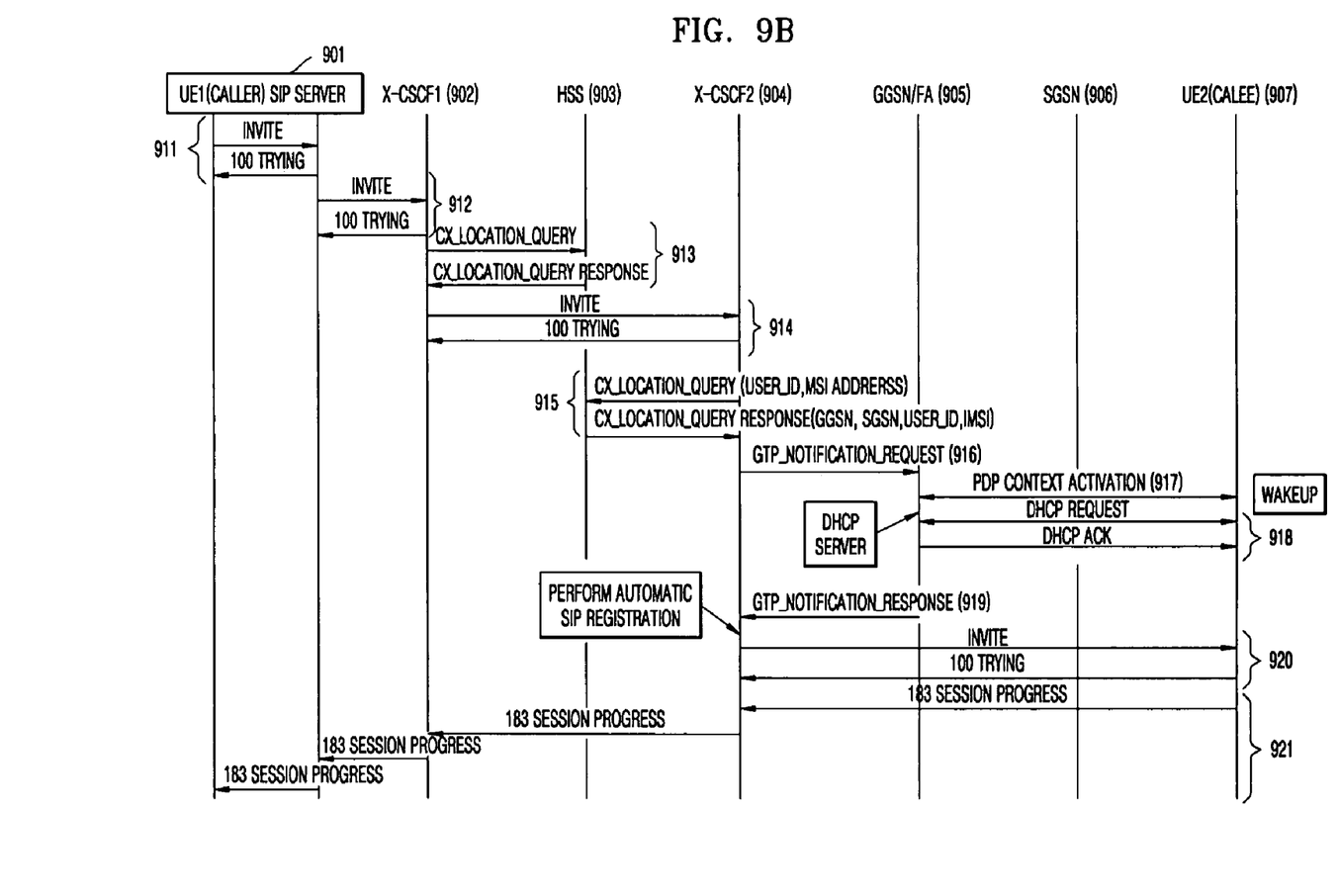
FIG. 9B is a flowchart of SIP INVITE performed when an unregistered MN uses a simple Internet Protocol (IP) in a GPRS area, according to an embodiment of the present invention.
Figure 10A:
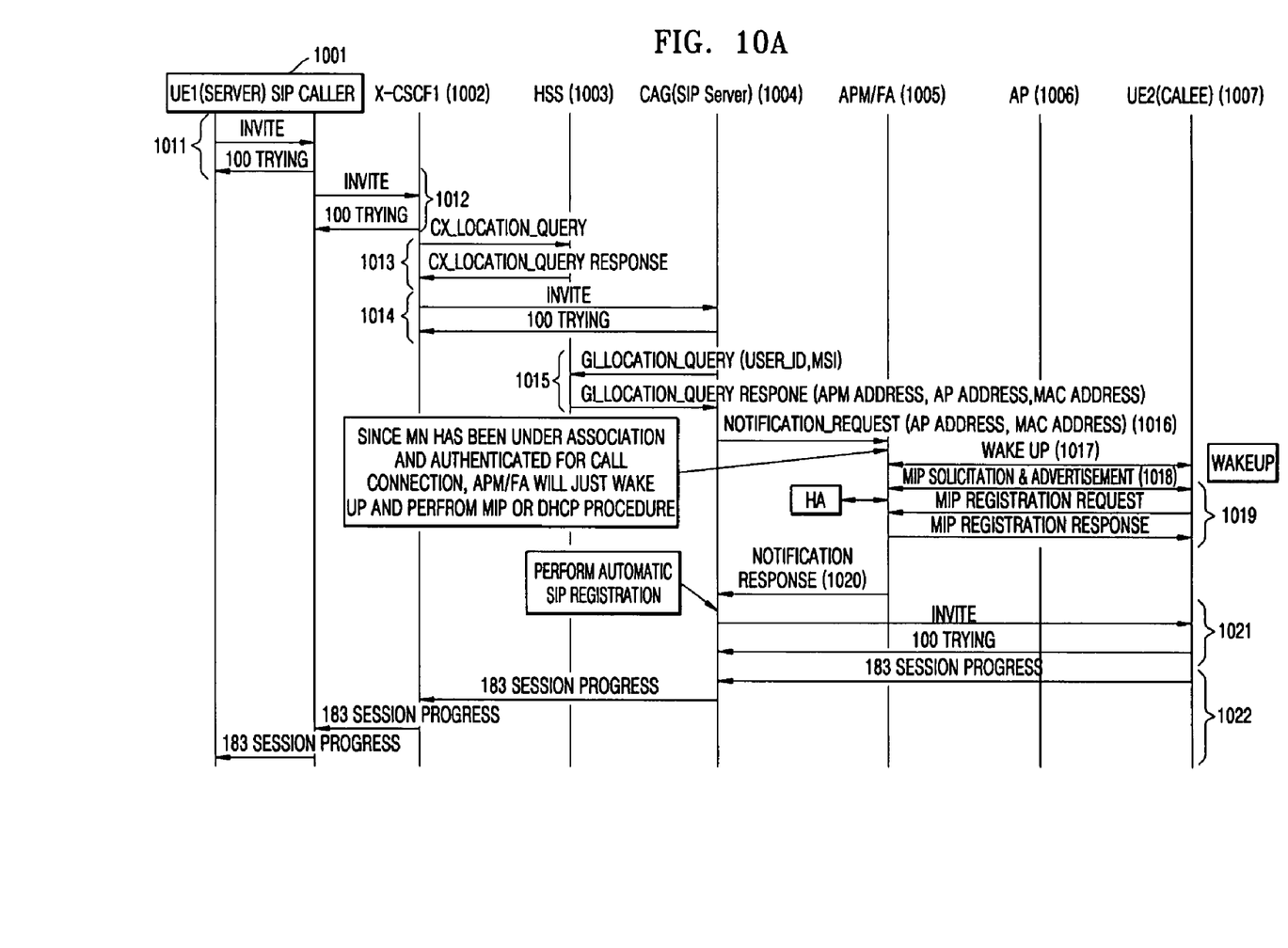
FIG. 10A is a flowchart of SIP INVITE performed when an unregistered MN uses a MIP in a WLAN area, according to an embodiment of the present invention.
Figure 10B:
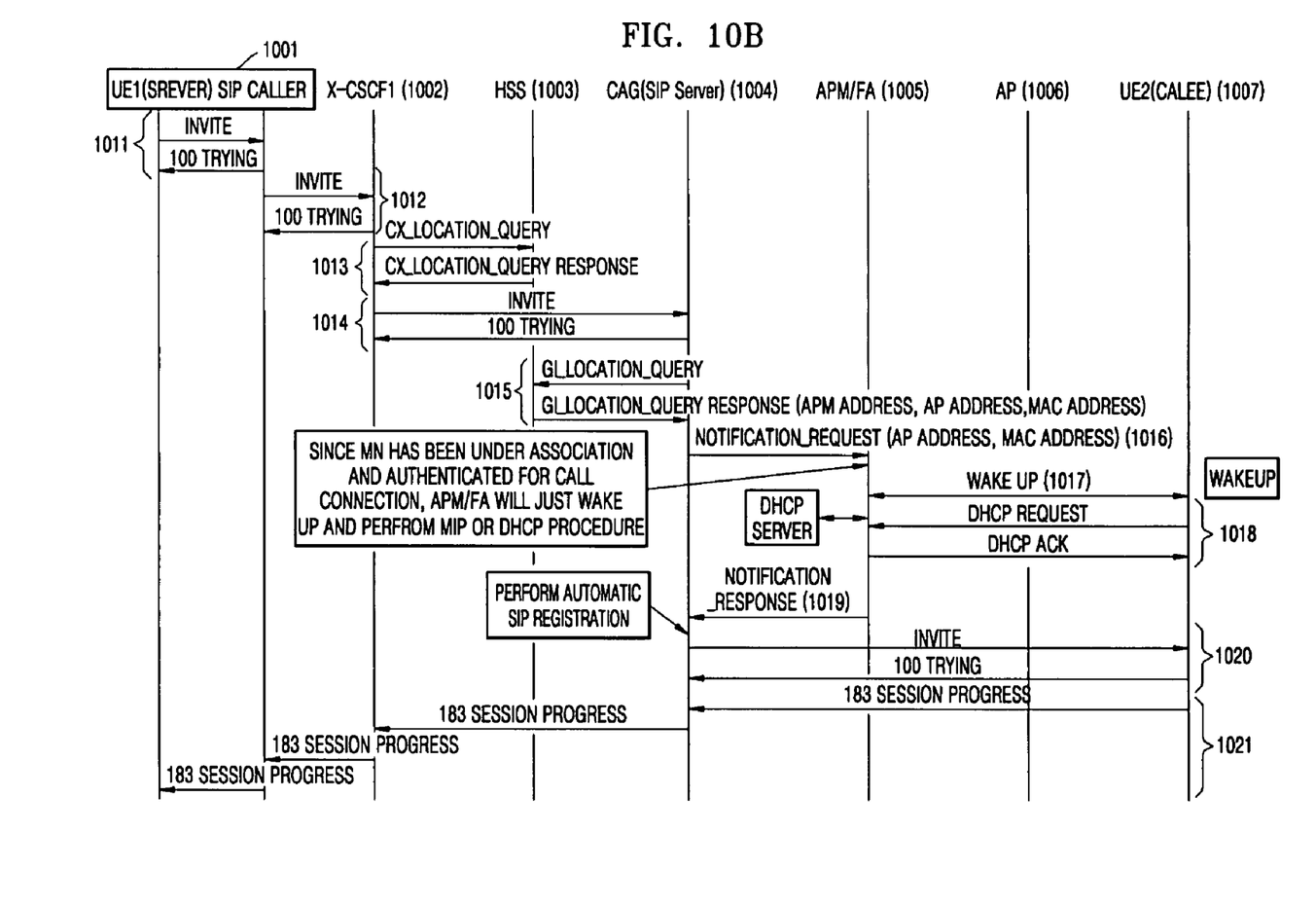
FIG. 10B is a flowchart of SIP INVITE performed when an unregistered MN uses a simple IP in a WLAN area, according to an embodiment of the present invention.

FIGS. 9A and 9B illustrate SIP INVITE performed for an unregistered MN in a GPRS area, according to an embodiment of the present invention. FIGS. 10A and 10B illustrate SIP INVITE performed for an unregistered MN in a WLAN area, according to an embodiment of the present invention. The SIP is a simple text-based application layer control protocol allowing at least two participants to create, modify, and terminate a session together. The session may be a remote conference using the Internet, telecommunication, telephoning, interview, event notification, instant messaging, or the like. The SIP is independent of lower packet protocols (such as a Transmission Control Protocol (TCP), a User Datagram Protocol (UDP), an ATM, and X.25). The SIP was designed after a text-based Simple Mail Transfer Protocol (SMTP) and HyperText Transfer Protocol (HTTP) were designed. The SIP is based on a client/server structure in which clients make calls and a server responds to the calls. More detailed descriptions are found in RFC 2543.

For INVITE, a SIP Uniform Resource Locator (URL) has a format of "user_id@domain" or "telephone_number@telco.net". When a MN 907 is located in a GPRS area or a WLAN area, a HSS 903 registers location information of the MN 907 according to the procedures described with reference to FIGS. 5 through 8. Registering the location information indicates registering in a DB a GGSN address or an APM address, which corresponds to a MAC address, an IMSI number, or a user_ID, but does not indicate SIP registration. In other words, neither IP connection nor SIP registration is not accomplished.

FIG. 9A illustrates SIP INVITE performed when the MN 907 to be invited is located in the GPRS area and uses a Mobile Internet Protocol (MIP). When an X-CSCF1 902 receives INVITE from a caller, i.e., a UE1 901 in operations 911 and 912, it performs CX-location-query with respect to the HSS 903 in operation 913 and redirects the INVITE to an X-CSCF2 904 to which the MN 907 belongs in operation 914. Here, the X-CSCF1 902 and the X-CSCF2 904 may be the same.

Upon receiving the INVITE, the X-CSCF2 904 recognizes that the MN 907 has not been subjected to SIP registration and performs CX-location-query with respect to the HSS 903 to detect a GGSN/FA 905 in operation 915. Next, the X-CSCF2 904 sends a GTP_NOTIFICATION_REQUEST to the GGSN/FA 905 in operation 916.

Next, context is activated among the GGSN/FA 905, a SGSN 906, and the MN, i.e., UE2 907 through a network request PDP context activation procedure in operation 917.

Next, the UE2 907 is allocated an IP address by performing MIP registration with respect to a HA and completes authentication in operation 918.

Thereafter, the GGSN/FA 905 sends a GTP_NOTIFICATION_RESPONSE to the X-CSCF2 904 in operation 919. In response to the GTP_NOTIFICATION_RESPONSE, the X-CSCF2 904 performs automatic SIP registration with respect to the UE2 907.

The X-CSCF2 904 transmits the INVITE to the UE2 907 in operation 920. Then, the UE2 907 drives a SIP and commences a normal SIP session setup procedure by sending 200 OK to the X-CSCF2 904 in operation 921.

FIG. 9B illustrates SIP INVITE performed when the MN 907 to be invited is located in the GPRS area and uses a simple IP. When an X-CSCF1 902 receives INVITE from a caller, i.e., a UE1 901 in operations 911 and 912, it performs CX-location-query with respect to the HSS 903 in operation 913 and redirects the INVITE to an X-CSCF2 904 to which the MN 907 belongs in operation 914. Here, the X-CSCF1 902 and the X-CSCF2 904 may be the same.

Upon receiving the INVITE, the X-CSCF2 904 recognizes that the MN 907 has not been subjected to SIP registration and performs CX-location-query with respect to the HSS 903 to detect a GGSN/FA 905 in operation 915. Next, the X-CSCF2 904 sends a GTP_NOTIFICATION_REQUEST to the GGSN/FA 905 in operation 916.

Next, context is activated among the GGSN/FA 905, a SGSN 906, and the MN, i.e., UE2 907 through a network request PDP context activation procedure in operation 917.

Next, the UE2 907 is allocated an IP address by a Dynamic Host Configuration Protocol (DHCP) server and completes authentication in operation 918.

Thereafter, the GGSN/FA 905 sends a GTP_NOTIFICATION_RESPONSE to the X-CSCF2 904 in operation 919. In response to the GTP_NOTIFICATION_RESPONSE, the X-CSCF2 904 performs automatic SIP registration with respect to the UE2 907.

The X-CSCF2 904 transmits the INVITE to the UE2 907 in operation 920. Then, the UE2 907 drives a SIP and commences a normal SIP session setup procedure by sending 200 OK to the X-CSCF2 904 in operation 921.

FIG. 10A illustrates SIP INVITE performed when a MN 1007 to be invited is located in a WLAN area and uses a MIP. When an X-CSCF1 1002 receives INVITE from a caller, i.e., a UE1 1001 that desires to call the MN 1007 in operations 1011 and 1012, it performs CX-location-query with respect to a HSS 1003 in operation 1013 and redirects the INVITE to a SIP server 1004 to which the MN 1007 belongs in operation 1014. Here, the X-CSCF1 1002 and the SIP server 1004 may be the same.

Upon receiving the INVITE, the SIP server, i.e., a CAG 1004 recognizes that the MN 1007 has not been subjected to SIP registration and performs CX-location-query with respect to the HSS 1003 to detect an APM/FA 1005 in operation 1015. Next, the CAG 1004 sends a NOTIFICATION_REQUEST to the APM/FA 1005 in operation 1016. Then, association and an Extensible Authentication Protocol (EAP) procedure are performed among the APM/FA 1005, an AP 1006, and the MN, i.e., UE2 1007 in operation 1017. Next, the UE2 1007 is allocated an IP address by performing MIP registration with respect to a HA and completes authentication in operations 1018 and 1019.

Thereafter, the APM/FA 1005 sends a NOTIFICATION_RESPONSE to the CAG 1004 in operation 1020. In response to the NOTIFICATION_RESPONSE, the CAG 1004 performs automatic SIP registration with respect to the UE2 1007.

The CAG 1004 transmits the INVITE to the UE2 1007 in operation 1021. Then, the UE2 1007 drives a SIP and commences a normal SIP session setup procedure by sending 200 OK to the CAG 1004 in operation 1022.

FIG. 10B illustrates SIP INVITE performed when a MN 1007 to be invited is located in a WLAN area and uses a simple IP. When an X-CSCF1 1002 receives INVITE from a caller, i.e., a UE1 1001 that desires to call the MN 1007 in operations 1011 and 1012, it performs CX-location query with respect to a HSS 1003 in operation 1013 and redirects the INVITE to a SIP server 1004 to which the MN 1007 belongs in operation 1014. Here, the X-CSCF1 1002 and the SIP server 1004 may be the same.

Upon receiving the INVITE, the SIP server, i.e., a CAG 1004 recognizes that the MN 1007 has not been subjected to SIP registration and performs CX-location-query with respect to the HSS 1003 to detect an APM/FA 1005 in operation 1015. Next, the CAG 1004 sends a NOTIFICATION_REQUEST to the APM/FA 1005 in operation 1016. Then, association and an Extensible Authentication Protocol (EAP) procedure are performed among the APM/FA 1005, an AP 1006, and the MN, i.e., UE2 1007 in operation 1017. Next, the UE2 1007 is allocated an IP address by performing IP registration with respect to a DHCP server and completes authentication in operation 1018.

Thereafter, the APM/FA 1005 sends a NOTIFICATION_RESPONSE to the CAG 1004 in operation 1019. In response to the NOTIFICATION_RESPONSE, the CAG 1004 performs automatic SIP registration with respect to the UE2 1007.

The CAG 1004 transmits the INVITE to the UE2 1007 in operation 1020. Then, the UE2 1007 drives a SIP and commences a normal SIP session setup procedure by sending 200 OK to the CAG 1004 in operation 1021.

A method of registering and handing off a MN and a method of processing a call using a SIP according to the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, hard disks, floppy disks, flash memory, optical data storage devices, and carrier waves (such as data transmission through the Internet). The computer readable recording medium can also be distributed over network coupled computer systems so that the computer readable code is stored and executed in a distributed fashion. In addition, a font-ROM data structure according to the present invention can be embodied as computer readable codes on a computer readable recording medium such as ROM, RAM, CD-ROM, a magnetic tape, a hard disk, a floppy disk, flash memory, or an optical data storage device.

As described above, the present invention allows a call to an unregistered user to be connected under a communication environment such as a WLAN that does not provide a location based service when an SIP based VoIP service is provided in association with a mobile communication network based on a 3G GPRS, thereby preventing inefficient waste of resources caused due to a conventional always-on method in which all MNs occupy network resources.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of registering and handing off a mobile node, comprising the operations of:
    collecting a Media Access Control (MAC) address of a user of the mobile node and transmitting the MAC address from an access point (AP) to an Access Point Manager (APM) when association occurs between the AP and the mobile node;
    determining one among initial registration of the mobile node and moving of the mobile node based on the MAC address in the APM;
    sending a MAC request message to a Home Subscriber Server (HSS) of the initial registration of the mobile node is determined; and
    updating a database with the MAC address of the mobile node and transmitting registration information to the AP, if the initial registration is determined by the HSS receiving the MAC request message, wherein the operation of updating the database and transmitting the registration information comprises the operations of:
    requesting the AP to update the MAC address of the mobile node if the AP belongs to a new area which the mobile node moves to and enters; and
    requesting an old APM that the mobile node accessed to cancel information of the mobile node.

2. The method of claim 1, further comprising the operation of requesting an old Serving General Packet Radio Service (GPRS) Service Node (SGSN) that the mobile node accessed to cancel a location of the mobile node when the mobile node has been subjected to vertical hand off from a GPRS area.

3. The method of claim 1, wherein the database is managed by the HSS and comprises a user identifier (ID), an International Mobile Station Identity (IMSI) number, a MAC address, an APM address, and an AP address.

4. A method of connecting a call to a mobile node present in a General Packet Radio Service (GPRS) area using a Session Initiation Protocol (SIP), the method comprising the operation of:
 registering location information of the mobile node to be invited in a Home Subscriber Server (HSS);
 when the mobile node uses a Mobile Internet Protocol (MIP), allocating an Internet Protocol (IP) address to the mobile node and authenticating the mobile node through MIP registration and setting a SIP session; and
 when the mobile node uses a simple IP, allocating an IP address to the mobile node and authenticating the mobile node through a Dynamic Host Configuration Protocol (DHCP) procedure and setting a SIP session.

5. The method of claim 4, wherein the operation of allocating the IP address, authenticating the mobile node, and setting the SIP session when the mobile uses the MIP comprises the operations of:
 receiving INVITE using a Call Session Control Function (CSCF) and transmitting a GTP_NOTIFICATION_REQUEST to a Gateway General Packet Radio Service (GPRS) Service Node (GGSN)/foreign agent (FA) that is detected by performing CX-location-query with respect to a Home Subscriber Server (HSS);
 activating context among the GGSN/FA, a Serving GPRS Service Node (SGSN), and the mobile node through a network request Packet Data Protocol (PDP) context activation procedure;
 performing MIP registration with respect to a home agent of the mobile node to allocate the IP address to the mobile node;
 transmitting a GTP_NOTIFICATION_RESPONSE from the GGSN/FA to the CSCF;
 performing SIP registration of the mobile node in the CSCF receiving the GTP_NOTIFICATION_RESPONSE; and
 transmitting the INVITE from the CSCF to the mobile node, driving the SIP in the mobile node, and transmitting 200 OK from the mobile node to the CSCF to set the SIP session.

6. The method of claim 4, wherein the operation of allocating the IP address, authenticating the mobile node, and setting the SIP session when the mobile uses the simple IP comprises the operations of:
 receiving INVITE using a Call Session Control Function (CSCF) and transmitting a GTP_NOTIFICATION_REQUEST to a Gateway General Packet Radio Service (GPRS) Service Node (GGSN)/foreign agent (FA) that is detected by performing CX-location-query with respect to a Home Subscriber Server (HSS);
 activating context among the GGSN/FA, a Serving GPRS Service Node (SGSN), and the mobile node through a network request Packet Data Protocol (PDP) context activation procedure;
 allocating the IP address to the mobile node and completing authentication using a DHCP server managing the mobile node;
 transmitting a GTP_NOTIFICATION_RESPONSE from the GGSN/FA to the CSCF;
 performing SIP registration of the mobile node in the CSCF receiving the GTP_NOTIFICATION_RESPONSE; and
 transmitting the INVITE from the CSCF to the mobile node, driving the SIP in the mobile node, and transmitting 200 OK from the mobile node to the CSCF to set the SIP session.

7. The method of claim 4, wherein the operation of registering the location information of the mobile node comprises the operations of:
 collecting a Media Access Control (MAC) address of a user of the mobile node and transmitting the MAC address from an access point (AP) to an Access Point Manager (APM) when association occurs between the AP and the mobile node;
 determining one among initial registration of the mobile node and moving of the mobile node based on the MAC address in the APM;
 sending a MAC request message to the HSS if the initial registration of the mobile node is determined; and
 updating a database with the MAC address of the mobile node and transmitting registration information to the AP, if the initial registration is determined by the HSS receiving the MAC request message.

8. The method of claim 7, wherein the operation of updating the database and transmitting the registration information comprises the operations of:
 requesting the AP to update the MAC address of the mobile node if the AP belongs to a new area which the mobile node moves to and enters; and
 requesting an old APM that the mobile node accessed to cancel information of the mobile node.

9. The method of claim 8, further comprising the operation of requesting an old Serving General Packet Radio Service (GPRS) Service Node (SGSN) that the mobile node accessed to cancel a location of the mobile node when the mobile node has been subjected to vertical hand off from a GPRS area.

10. The method of claim 7, wherein the database is managed by the HSS and comprises a user identifier (ID), an International Mobile Station Identity (IMSI) number, a MAC address, an APM address, and an AP address.

11. A method of connecting a call to a mobile node present in a Wireless Local Area Network (WLAN) area using a Session Initiation Protocol (SIP), the method comprising the operation of:
 registering location information of the mobile node to be invited in a Home Subscriber Server (HSS);
 when the mobile node uses a Mobile Internet Protocol (MIP), allocating an Internet Protocol (IP) address to the mobile node and authenticating the mobile node through MIP registration; and
 when the mobile node uses a simple IP, allocating an IP address to the mobile node and authenticating the mobile node through a Dynamic Host Configuration Protocol (DHCP) procedure.

12. The method of claim 11, wherein the operation of allocating the IP address and authenticating the mobile node when the mobile uses the MIP comprises the operations of:
 receiving INVITE using a Call Session Control Function (CSCF) and transmitting a NOTIIFICATION_REQUEST to a Access Point Manager (APM)/foreign agent (FA) that is detected by performing CX-location-query with respect to a Home Subscriber Server (HSS);
 performing association and an Extensible Authentication Protocol (EAP) procedure among the APM/FA, an access point (AP), and the mobile node;

performing MIP registration with respect to a home agent of the mobile node to allocate the IP address to the mobile node;

transmitting a NOTIFICATION_RESPONSE from the APM/FA to a Cable Access Gateway (CAG) functioning as a SIP server;

performing SIP registration of the mobile node in the CAG receiving the NOTIFICATION_RESPONSE; and transmitting the INVITE from the CAG to the mobile node, driving the SIP in the mobile node, and transmitting 200 OK from the mobile node to the CAG to set the SIP session.

13. The method of claim 11, wherein the operation of allocating the IP address and authenticating the mobile node when the mobile uses the simple IP comprises the operations of:

receiving INVITE using a Call Session Control Function (CSCF) and transmitting a NOTIFICATION_REQUEST to a Access Point Manager (APM)/foreign agent (FA) that is detected by performing CX-location-query with respect to a Home Subscriber Server (HSS);

performing association and an Extensible Authentication Protocol (EAP) procedure among the APM/FA, an access point (AP), and the mobile node;

allocating the IP address to the mobile node and completing authentication using a DHCP server managing the mobile node;

transmitting a NOTIFICATION_RESPONSE from the APM/FA to a Cable Access Gateway (CAG) functioning as a SIP server;

performing SIP registration of the mobile node in the CAG receiving the NOTIFICATION_RESPONSE; and transmitting the INVITE from the CAG to the mobile node, driving the SIP in the mobile node, and transmitting 200 OK from the mobile node to the CAG to set the SIP session.

14. The method of claim 11, wherein the operation of registering the location information of the mobile node comprises the operations of:

collecting a Media Access Control (MAC) address of a user of the mobile node and transmitting the MAC address from an access point (AP) to an Access Point Manager (APM) when association occurs between the AP and the mobile node;

determining one among initial registration of the mobile node and moving of the mobile node based on the MAC address in the APM;

sending a MAC request message to the HSS if the initial registration of the mobile node is determined; and updating a database with the MAC address of the mobile node and transmitting registration information to the AP, if the initial registration is determined by the HSS receiving the MAC request message.

15. The method of claim 14, wherein the operation of updating the database and transmitting the registration information comprises the operations of:

requesting the AP to update the MAC address of the mobile node if the AP belongs to a new area which the mobile node moves to and enters; and requesting an old APM that the mobile node accessed to cancel information of the mobile node.

16. The method of claim 15, further comprising the operation of requesting an old Serving General Packet Radio Service (GPRS) Service Node (SGSN) that the mobile node accessed to cancel a location of the mobile node when the mobile node has been subjected to vertical hand off from a GPRS area.

17. The method of claim 14, wherein the database is managed by the HSS and comprises a user identifier (ID), an International Mobile Station Identity (IMSI) number, a MAC address, an APM address, and an AP address.

* * * * *